US008441901B2

(12) United States Patent
Kajikawa

(10) Patent No.: US 8,441,901 B2
(45) Date of Patent: May 14, 2013

(54) OPTICAL DISC APPARATUS

(75) Inventor: Kazuki Kajikawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/461,939

(22) Filed: May 2, 2012

(65) Prior Publication Data

US 2012/0307610 A1 Dec. 6, 2012

(30) Foreign Application Priority Data

May 31, 2011 (JP) ................................ 2011-121912

(51) Int. Cl.
 *G11B 7/00* (2006.01)

(52) U.S. Cl.
 USPC ..................... 369/44.32; 369/53.28

(58) Field of Classification Search ........................ None
 See application file for complete search history.

(56) References Cited

U.S. PATENT DOCUMENTS

| | | | | | |
|---|---|---|---|---|---|
| 4,800,548 | A | * | 1/1989 | Koishi et al. ................ | 369/53.18 |
| 4,989,190 | A | * | 1/1991 | Kuroe et al. ................ | 369/30.13 |
| 5,034,940 | A | * | 7/1991 | Saito et al. ................. | 369/44.34 |
| 5,193,081 | A | * | 3/1993 | Osawa et al. .............. | 369/44.26 |
| 5,249,213 | A | * | 9/1993 | Kobunaya ...................... | 377/39 |
| 5,307,333 | A | * | 4/1994 | Ikeda et al. ................ | 369/44.28 |
| 5,315,567 | A | * | 5/1994 | Fuji et al. .................. | 369/30.13 |
| 5,351,222 | A | * | 9/1994 | Ikeda et al. ................ | 369/30.17 |
| 5,428,591 | A | * | 6/1995 | Lee ............................ | 369/44.34 |
| 5,459,705 | A | * | 10/1995 | Matoba et al. ............. | 369/44.34 |
| 5,499,230 | A | * | 3/1996 | Yanagi ....................... | 369/44.28 |
| 5,612,933 | A | * | 3/1997 | Iso et al. .................... | 369/44.27 |
| 5,638,350 | A | * | 6/1997 | Fuji ............................ | 369/44.37 |
| 5,914,922 | A | * | 6/1999 | Supino et al. .............. | 369/44.28 |
| 5,953,296 | A | * | 9/1999 | Baba ........................... | 369/44.32 |
| 6,392,966 | B1 | * | 5/2002 | Kamiyama .................. | 369/44.28 |
| 6,400,662 | B1 | * | 6/2002 | Choi et al. .................. | 369/44.28 |
| 6,813,231 | B1 | * | 11/2004 | Hanks ......................... | 369/47.38 |
| 6,934,234 | B2 | * | 8/2005 | Lai .............................. | 369/53.35 |
| 7,035,187 | B2 | * | 4/2006 | Li et al. ...................... | 369/53.28 |
| 7,133,342 | B2 | * | 11/2006 | Choi et al. .................. | 369/53.22 |
| RE40,822 | E | * | 7/2009 | Lai .............................. | 369/53.35 |
| 8,203,918 | B2 | * | 6/2012 | Eshita ......................... | 369/44.34 |
| 2002/0145962 | A1 | * | 10/2002 | Nishio et al. ............... | 369/53.23 |
| 2002/0163864 | A1 | * | 11/2002 | Ono ............................ | 369/30.21 |
| 2002/0181374 | A1 | * | 12/2002 | Lai .............................. | 369/53.35 |
| 2003/0021207 | A1 | * | 1/2003 | Ono ............................ | 369/53.23 |

(Continued)

FOREIGN PATENT DOCUMENTS

JP 2006-164335 6/2006

*Primary Examiner* — Peter Vincent Agustin
(74) *Attorney, Agent, or Firm* — Morgan, Lewis & Bockius LLP

(57) ABSTRACT

An optical disc apparatus includes an optical pickup, a signal generation section which generates a total reflection signal and a focus error signal, and a servo control section which controls optical pickup. The optical disc apparatus further includes a main control section which binarizes the track cross signal by using a predetermined threshold value and, by using the binarized track cross signal, checks the tracing state of a track. The main control section controls the servo control section to check, by tracing one turn of the track of an optical disc, whether or not a tracking servo deviation occurs. When a tracking servo deviation occurs during the tracing, the main control section controls the servo control section to make the check once again. When, in the check made once again, a tracking servo deviation is found to occur again, the main control section increases the threshold value used in binarization.

4 Claims, 7 Drawing Sheets

U.S. PATENT DOCUMENTS

| | | | |
|---|---|---|---|
| 2003/0156505 A1* | 8/2003 | Yoon et al. | 369/30.13 |
| 2006/0077800 A1* | 4/2006 | Hsieh et al. | 369/44.27 |
| 2006/0120252 A1* | 6/2006 | Kanda et al. | 369/125 |
| 2006/0171269 A1* | 8/2006 | Hiramatsu et al. | 369/47.1 |
| 2009/0122678 A1* | 5/2009 | Wang et al. | 369/53.23 |
| 2009/0296544 A1* | 12/2009 | Imagawa et al. | 369/47.14 |

* cited by examiner

FIG.5

| NUMBER OF LOW-TO-HIGH TRANSITIONS IN BINARIZED TEC | MAXIMUM DETECTION PERIOD |
|---|---|
| TEN TIMES | 3ms |

OPTICAL DISC APPARATUS

This application is based on Japanese Patent Application No. 2011-121912 filed on May 31, 2011, the contents of which are hereby incorporated by reference.

BACKGROUND OF THE INVENTION

1. Field of the Invention

The present invention relates to optical disc apparatus for playback from or recording to optical discs, and more particularly relates to optical disc apparatus that can suppress erroneous detection of tracking failures.

2. Description of Related Art

Today, optical discs such as CDs (compact discs) and DVDs (digital versatile discs) are popular and widely used. For the recording and playback of information, such as audio and video information, to and from optical discs, optical disc apparatus are available. Well-known optical disc apparatus include, among others, CD players, DVD players, and CD-ROM drives connected to personal computers.

An optical disc apparatus is provided with an optical pickup for irradiating an optical disc with a light beam to read information. The optical pickup shines the optical beam onto the information recording surface of the optical disc, which is fixed to a turntable and is being rotated.

The light reflected from the information recording surface is received by a photodetector, for example a photodiode, provided inside the optical pickup. The photodetector converts the light into an electrical signal and, based on the thus obtained electrical signal, outputs the information recorded on the optical disc.

Accurate reading of information from the optical disc requires operation whereby the optical axis of the light beam is made to follow the center of a sequence of pits (tracking operation). For that purpose, the optical pickup incorporates an actuator for driving an objective lens in the radial direction of the optical disc and a tracking servo for controlling the actuator.

In this connection, there have been proposed devices that generate a binarized track cross signal to detect tracking failures wherein the conditions for a retry on detection of a tracking failure are eased for reliable detection of extraneous vibration and impact (see, for example, JP-A-2006-164335).

Inconveniently, however, with the conventional technology like that mentioned above, if an optical disc has, due to its physical properties etc., a spot at which the binarized track cross signal tends to rise, a tracking failure may be detected erroneously, causing the tracking servo to be turned off.

Once this happens, even when a retry operation is executed to track on again, it is highly likely that a similar fault immediately occurs, leading to repeated retries resulting in failure to read. Consequently, during the playback etc. of the optical disc, servo deviations occur frequently, causing failure to mount and halts in video during playback.

SUMMARY OF THE INVENTION

An object of the present invention is to provide an optical disc apparatus capable of playback or recording with reduced likelihood of failure to mount an optical disc and of halts in video during playback.

To achieve the above object, according to the present invention, an optical disc apparatus includes: an optical pickup including a light source which irradiates the recording surface of an optical disc with a light beam and a photodetector which performs photoelectric conversion on the light reflected from the recording surface; a signal generation section which generates a tracking error signal and a track cross signal from the electrical signal obtained by the photoelectric conversion; a servo control section which controls the tracking of the optical pickup according to the tracking error signal and the track cross signal; a storage section which has stored therein a threshold value for binarizing the track cross signal; and a main control section which binarizes the track cross signal by using the threshold value and, by using the binarized track cross signal, checks the tracing state of the track provided on the recording surface. Here, when the servo control section detects a predetermined error, the main control section increases the threshold value and binarizes the track cross signal by using the increased threshold value.

To achieve the above object, in the optical disc apparatus according to the invention, the main control section controls the servo control section to check, by tracing one turn of the track of the optical disc, whether or not a tracking servo deviation occurs, and when a tracking servo deviation occurs, the main control section controls the servo control section to make the check once again, and when, in the check made once again, a tracking servo deviation is found to occur again, the main control section increases the threshold value.

To achieve the above object, in the optical disc apparatus according to the invention, when the main control section controls the servo control section to make the check once again, the main control section controls the servo control section to make the check once again for the same one turn of the track as that in which the tracking servo deviation was detected.

To achieve the above object, in the optical disc apparatus according to the invention, the main control section initializes the threshold value when the servo control section no longer detects the error or the servo control section ends tracking servo.

As described above, according to the present invention, when predetermined errors, in particular tracking servo deviations, occur frequently, the threshold for binarizing the track cross signal is increased and thus the settings are changed such that the binarized track cross signal is less likely to rise. In this way, it is possible to prevent failure to mount an optical disc, and halts in video during playback, resulting from erroneous detection of tracking failures.

BRIEF DESCRIPTION OF THE DRAWINGS

FIG. 5 is a table showing the conditions for detection of a tracking failure;

DETAILED DESCRIPTION OF PREFERRED EMBODIMENTS

Hereinafter, the present invention will be described by way of an embodiment with reference to the accompanying drawings. It should be understood that the embodiment described below is simply illustrative and is in no way meant to limit the invention.

1. Internal Configuration

Figure 1:
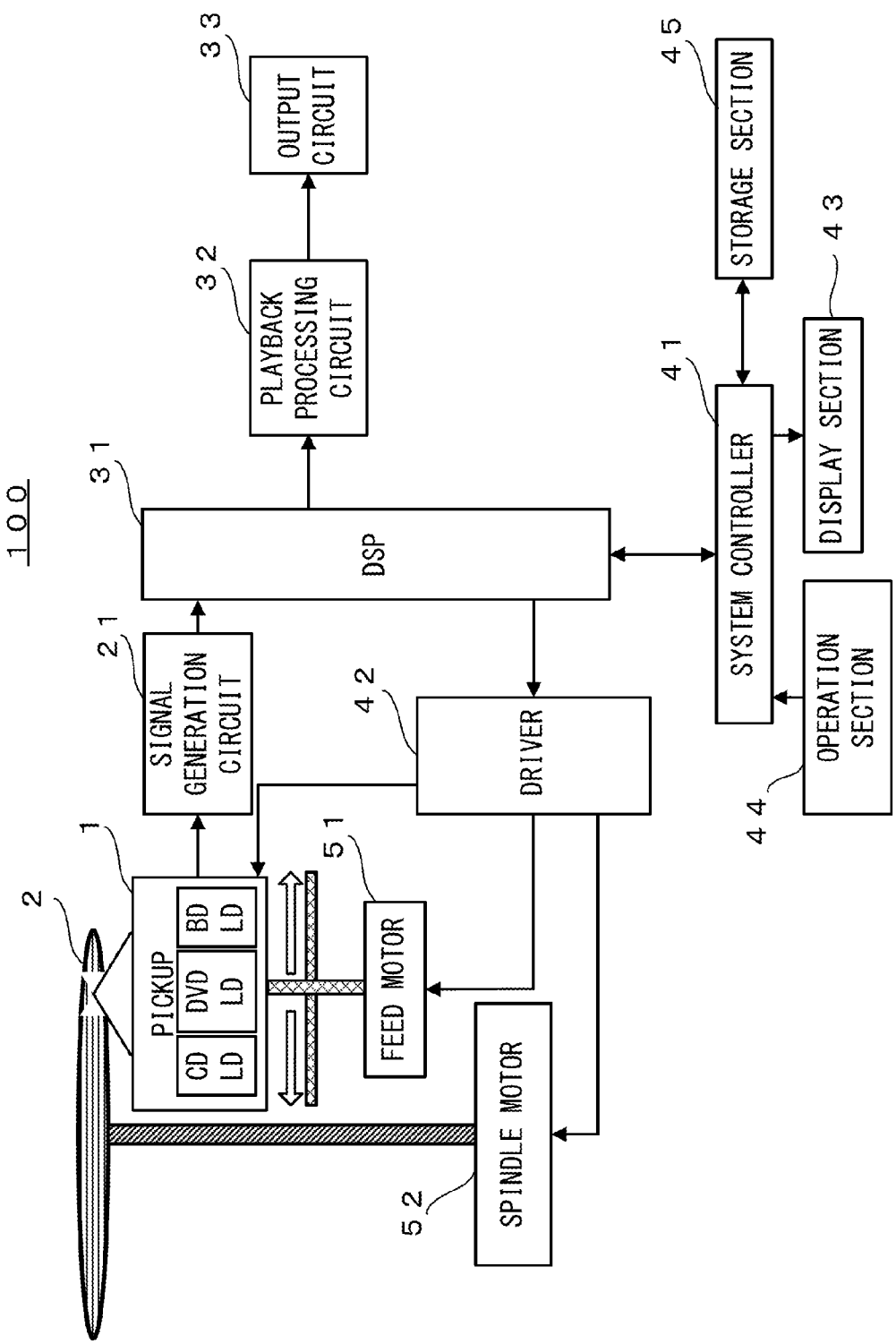
FIG. 1 is a block diagram showing the configuration of an optical disc apparatus in one embodiment of the invention.

FIG. 1 is a diagram showing the configuration of a disc player 100 (as an optical disc apparatus) embodying the invention. The disc player 100 includes an optical pickup 1, a signal generation circuit 21 (as a signal generation section), a DSP (digital signal processor) 31 (as a servo control section), a playback processing circuit 32, an output circuit 33, a system controller 41 (as a main control section), a driver 42, a display section 43, an operation section 44, a storage section 45, a feed motor 51, and a spindle motor 52.

The optical pickup 1 irradiates an optical disc 2 with a light beam to read various kinds of information, such as audio information and video information, recorded on the optical disc 2. The optical pickup 1 is provided with a light beam for CDs, a light beam for DVDs, and a light beam for BDs (Blu-ray Discs, a registered trademark). The configuration inside the optical pickup 1 will be described in detail later.

The signal generation circuit 21 performs calculation processing on the basis of the signal obtained from a photodetector 19 (see FIG. 2) provided in the optical pickup 1 to generate various signals such as an RF signal, a focus error signal, a tracking error signal, and a track cross signal. The thus generated various signals are fed to the DSP 31.

The DSP 31 performs image processing on the basis of the RF signal fed from the signal generation circuit 21 to generate a video signal, and feeds it to the playback processing circuit 32. The playback processing circuit 32 performs D/A (digital to analog) conversion processing on the image signal for output to an unillustrated monitor. The signal obtained through the conversion processing is fed via the output circuit 33 to an external device.

The DSP 31 generates servo signals based on the focus error signal and tracking error signal fed from the signal generation circuit 21; it generates, for example, a tracking servo signal for achieving tracking servo and a focus servo signal for achieving focus servo. The generated servo signals are fed to the driver 42. Thus, the tracking control, focus control, etc. of an objective lens 17 (see FIG. 2) provided in the optical pickup 1 are achieved.

The system controller 41 controls, via the DSP 31, the operation of the optical pickup 1, the feed motor 51, the spindle motor 52, etc. The system controller 41 is realized for example, through execution of a predetermined software program on a calculation processing device such as a plurality of microprocessors.

The system controller 41, on one hand, accepts information from the operation section 44 and transfers it to the DSP 31 and, on the other hand, receives information from the DSP 31 and transfers it to the display section 43. The system controller 41 also stores information used in various calculations in the storage section 45, which is composed of a semiconductor storage device or the like.

The driver 42 controls, based on the servo signals etc. fed from the DSP 31, the driving of the optical pickup 1, the feed motor 51, and the spindle motor 52. The feed motor 51 drives the optical pickup 1 in the radial direction of the optical disc 2. The spindle motor 52 drives the optical disc 2 in its rotation direction.

2. Configuration of the Optical Pickup

Figure 2:
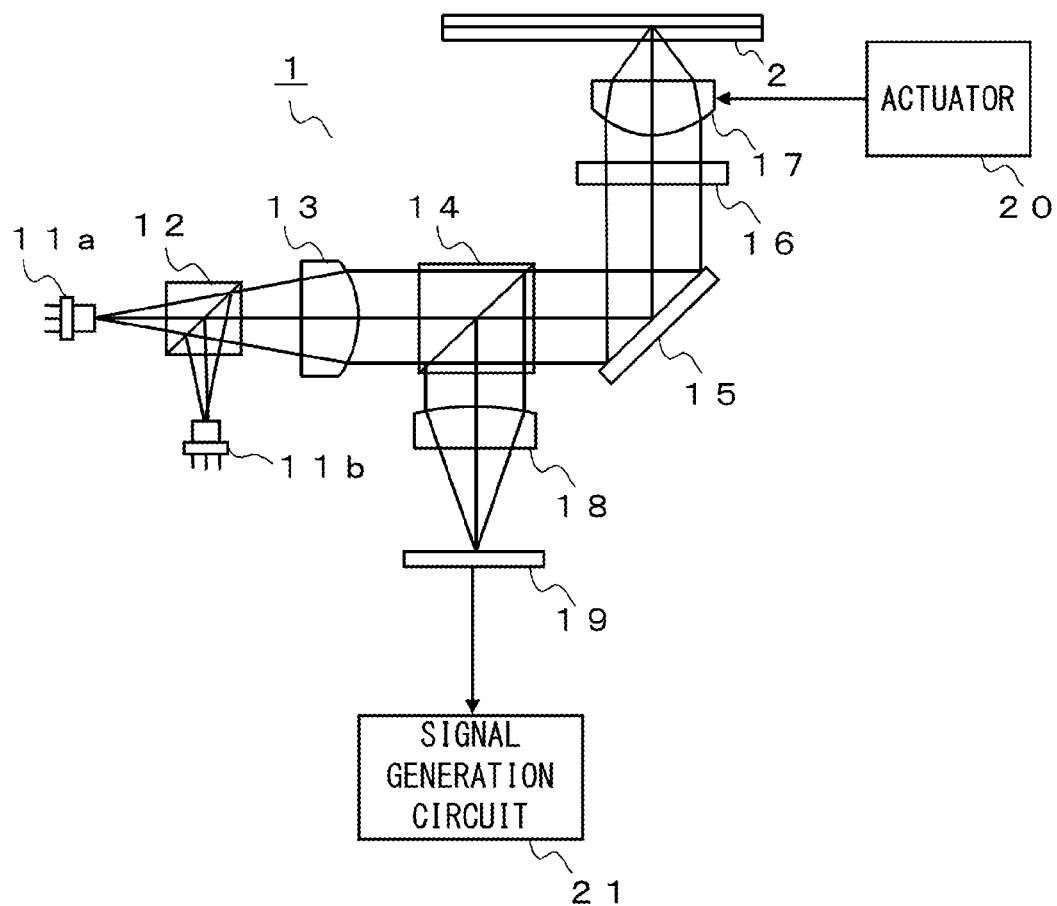
FIG. 2 is a diagram schematically showing the optical system of an optical pickup in one embodiment of the invention.

FIG. 2 is a diagram showing an outline of the configuration of the optical system of the optical pickup 1 in one embodiment of the invention. The optical pickup 1 shines a light beam onto the optical disc 2 and receives the reflected light; it thereby reads information recorded on the recording surface of the optical disc 2.

The optical pickup 1 includes a first light source 11*a*, a second light source 11*b*, a dichroic prism 12, a collimator lens 13, a beam splitter 14, a deflecting mirror 15, a liquid crystal element 16, an objective lens 17, a detection lens 18, a photodetector 19, and an actuator 20.

The first light source 11*a* is a laser light source that can emit a light beam in a 650 nm band corresponding to DVDs and a light beam in a 780 nm band corresponding to CDs. The second light source 11*b* is a laser diode that can emit light in a 405 nm band corresponding to BDs.

Although the embodiment under discussion deals with a case where, as the first light source 11*a*, a two-wavelength integrated laser diode having two light-emission points is used which can emit light beams of two different wavelengths, this is not meant as any limitation; instead, it is possible to use, for example, a laser diode that emits a light beam of a single wavelength alone.

The dichroic prism 12 transmits the light beam emitted from the first light source 11*a*, which emits the light beam for DVDs, and reflects the light beam emitted from the second light source 11*b*, which emits the light beam for BDs. The dichroic prism 12 aligns the optical axes of the light beams emitted from the first and second light sources 11*a* and 11*b* with each other. The light beam thus transmitted or reflected by the dichroic prism 12 is directed to the collimator lens 13.

The collimator lens 13 converts the light beam transmitted through the dichroic prism 12 into a parallel beam. Here, a parallel beam denotes a beam of light in which the paths of all the rays of light emitted from the first and second light sources 11*a* and 11*b* are substantially parallel to the optical axis. The light beam converted into a parallel beam by the collimator lens 13 is directed to the beam splitter 14.

The beam splitter 14 functions as a light splitting element that splits the incoming light beam. The beam splitter 14, on one hand, transmits the light beam coming from the collimator lens 13 to direct it toward the optical disc 2 and, on the other hand, reflects the light reflected from the optical disc 2 to direct it toward the photodetector 19. The light beam transmitted through the beam splitter 14 is directed to the deflecting mirror 15.

The deflecting mirror 15 reflects the light beam transmitted through the beam splitter 14 to direct it to the optical disc 2. The deflecting mirror 15 is inclined at 45° with respect to the optical axis of the light beam from the beam splitter 14, and the optical axis of the light beam reflected from the deflecting mirror 15 is approximately perpendicular to the recording surface of the optical disc 2. The light beam reflected on the deflecting mirror 15 is directed to the liquid crystal element 16.

Applying a voltage across liquid crystal (not shown) held between transparent electrodes (none is shown) causes liquid crystal molecules to change their alignment direction. Exploiting this property, the liquid crystal element 16 varies the refractive index of the liquid crystal and thereby controls the phase of the light beam transmitted through it.

Disposing the liquid crystal element 16 makes it possible to correct the spherical aberration arising from variation in the thickness of the resin layer protecting the recording surface of the optical disc 2. The light beam transmitted through the liquid crystal element 16 is directed to the objective lens 17.

The objective lens 17 makes the light beam transmitted through the liquid crystal element 16 converge on the recording surface of the optical disc 2. The objective lens 17 is movable by the actuator 20, which will be described later, for example, in the up-down direction and in the left-right direction in FIG. 2, and its position is controlled according to the focus servo signal and tracking servo signal.

The light reflected from the optical disc 2 passes through the objective lens 17 and then through the liquid crystal element 16, is then reflected on the deflecting mirror 15, is then reflected again on the beam splitter 14, and is then made to converge by the detection lens 18 on the photosensor provided on the photodetector 19.

The photodetector 19 converts the light received by the photosensor, such as a photodiode, into an electrical signal, and feeds it to the signal generation circuit 21. The photodetector 19 has a photosensitive area divided into, for example, four regions, and can, for each region individually, perform photoelectric conversion and output an electrical signal.

The actuator 20 moves the objective lens 17 in the radial direction of the optical disc 2 according to an objective lens drive signal generated by and fed from the driver 42. The actuator 20 here may be, but is not limited to, one that drives the objective lens 17 with a Lorentz force by passing a drive electric current across a coil (not shown) placed in the magnetic field formed by a permanent magnet (not shown).

The actuator 20 thus achieves tracking, in which it moves the objective lens 17 in a direction along the recording surface of the optical disc 2; in addition, the actuator 20 also achieves tilting, in which it inclines the objective lens 17 so as to swing the optical axis of the light beam directed from the objective lens 17, and focusing, in which it moves the objective lens 17 closer to or away from the optical disc 2.

3. Track Retry Operation

Figure 3:
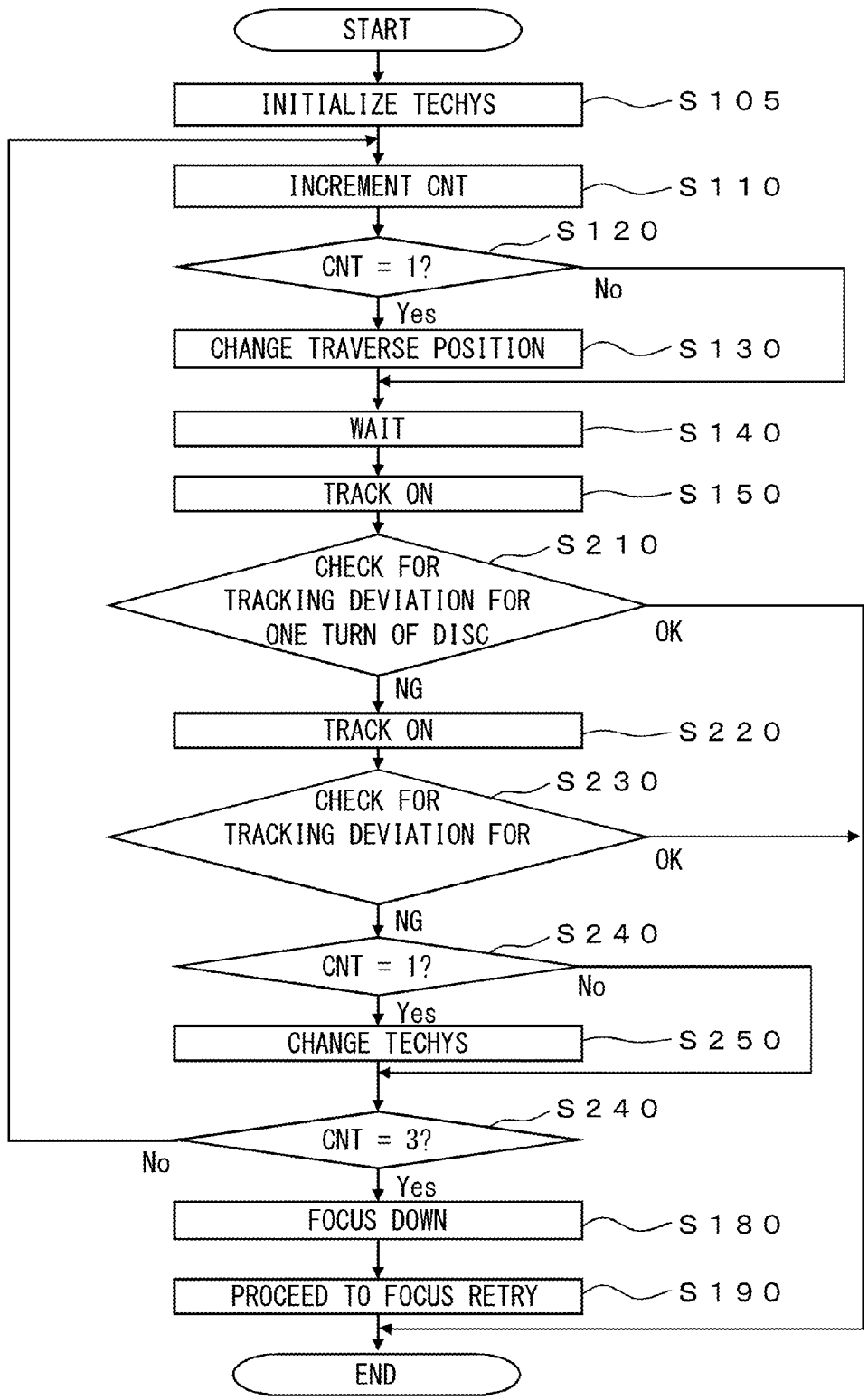
FIG. 3 is a flow chart showing tracking operation in one embodiment of the invention.
Figure 4:
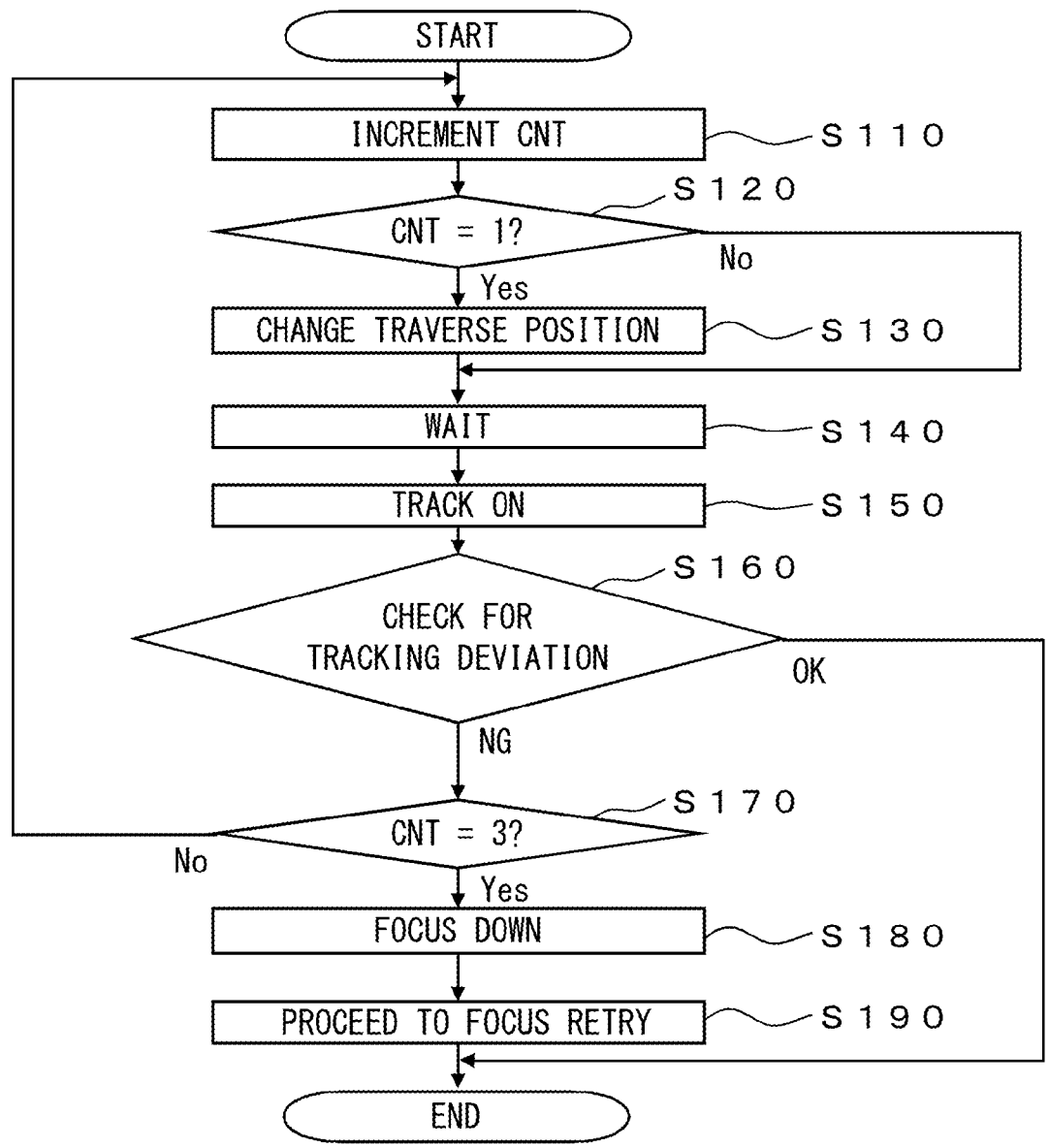
FIG. 4 is a flow chart showing conventional track retry operation.

Next, the track retry operation in one embodiment of the invention will be described with reference to flow charts in FIGS. 3 and 4. FIG. 3 is a flow chart showing the track retry operation according to the invention, and FIG. 4 is a flow chart showing the conventional track retry operation. Between the two flow charts, the same steps are identified by the same step numbers, and no overlapping description will be repeated.

First, the conventional track retry operation will be described. In the conventional track retry operation, a tracking failure (failure to trace a track) is detected, for example, on the basis of the conditions shown in FIG. 5. In the example shown in FIG. 5, when a binarized TEC signal (track cross signal) rises ten times within 3 ms (milliseconds), a tracking failure is detected to have occurred, and the tracking servo is turned off.

When the binarized TEC signal turns high depends on the amplitude and hysteresis width (threshold value) of the yet-to-be-binarized TEC signal. FIG. 6A is a diagram schematically showing the amplitude and hysteresis width (indicated as "TECHYS") of a yet-to-be-binarized TEC signal. FIG. 6B is a diagram schematically showing the binarized TEC signal. As shown in FIGS. 6A and 6B, each time the yet-to-be-binarized TEC signal goes beyond the hysteresis width, the binarized TEC signal turns between high and low.

Figure 7:
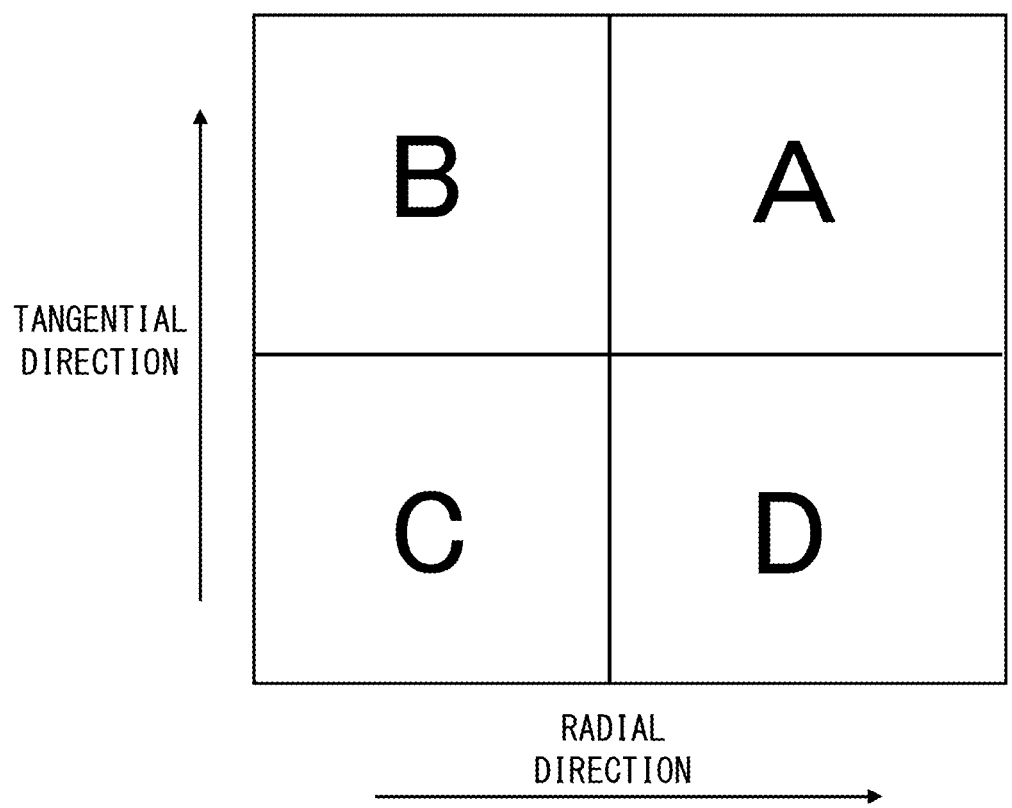
FIG. 7 is a diagram schematically showing a photosensitive area divided into regions.

The yet-to-be-binarized TEC signal is generated based on electrical signals obtained through photoelectric conversion in the four regions of the photosensitive area of the photosensor provided in the photodetector 19. As shown in FIG. 7, the photosensor is divided into segments A, B, C, and D. The TEC signal is generated based on electrical signals generated in these regions respectively.

The left-right direction in FIG. 7 corresponds to the radial direction of the optical disc 2. The up-down direction in FIG. 7 corresponds to the tangential direction to the sequence (track) of pits present on the recording surface of the optical disc 2. The yet-to-be-binarized TEC signal is the sum of the difference between the signals generated in regions A and B respectively and the difference between the signals generated in regions C and D respectively. It is thus given by the formula: $(B-A)+(C-D)$.

A description will now be given of the above-described conventional track retry operation using the TEC signal with reference to FIG. 4. The flow of operation shown in FIG. 4 starts when, during the playback etc. of the optical disc 2, the tracking servo turns on.

When the flow starts, at step S110, the system controller 41 increments a variable CNT by 1. The variable CNT is a variable for counting the number of incidences of tracking servo deviations, which will be described later, and is initially set at 0.

Next, at step S120, the system controller 41 checks whether or not the value of CNT equals 1 to branch the flow. If CNT does not equal 1, the flow branches to step S140, which will be described later. If CNT equals 1, then, at step S130, the system controller 41 controls the DSP 31 to change the traverse position.

Next, at step S140, the system controller 41 waits for a predetermined period. Next, at step S150, the system controller 41 controls the DSP 31 to execute a track-on with respect to the optical disc 2.

Next, at step S160, the system controller 41 checks for a tracking servo deviation for a predetermined period, for example 10 ms. The causes for a tracking servo deviation include, among others, the fulfillment of the conditions of a tracking failure (FIG. 4) due to the physical properties of the optical disc 2, and instability of the driving of the actuator 20.

If the check finds no tracking servo deviation within the predetermined period, the flow ends with the check result "OK," and a read operation follows. If a tracking servo deviation is found within the predetermined period, the flow proceeds to step S170 with the check result "NG."

Next, at step S170, the system controller 41 checks whether or not the value of CNT equals 3. If CNT does not equal 3, the flow returns to step S110. If CNT equals 3, then, at step S180, the system controller 41 turns the tracking servo off, and controls the DSP 31 to execute a focus-down.

Next, at step S190, the system controller 41 controls the DSP 31 to proceed to a focus retry operation, and then the flow ends.

With the flow of operation described above, if the disc has, due to its physical properties etc., a spot at which the TEC signal tends to rise during tracing, erroneous detection of tracking failures may occur frequently. This, inconveniently, makes it impossible to execute a read operation.

Next, the track retry operation according to the invention will be described with reference to FIG. 3. The flow of operation shown in FIG. 3, like that shown in FIG. 4, starts when, during the playback etc. of the optical disc 2, the tracking servo turns on.

Figure 6:
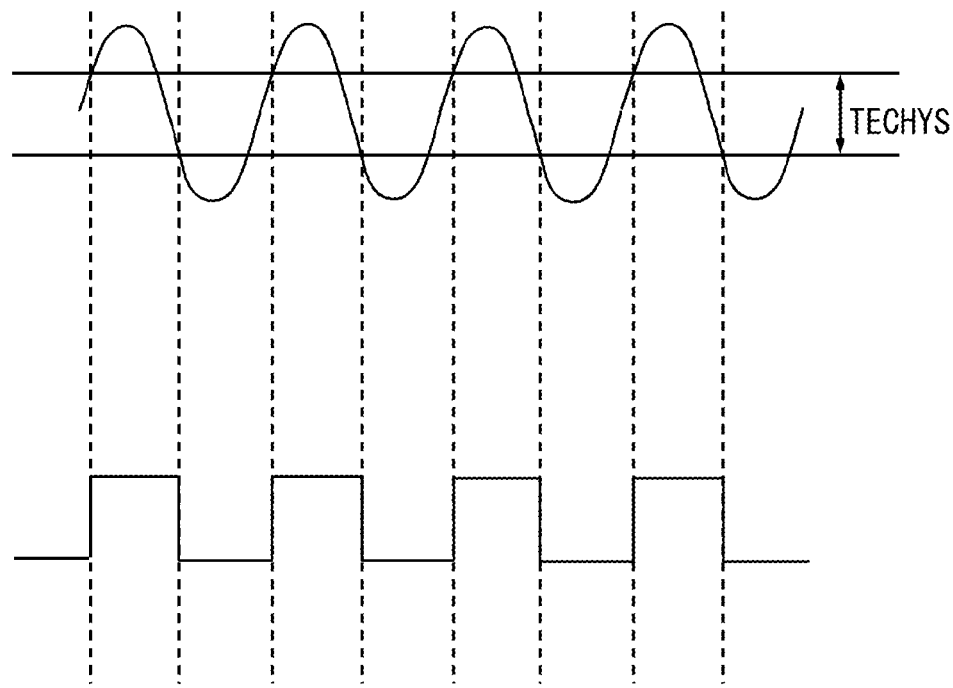
FIG. 6 is a diagram schematically showing a track cross signal.

When the flow starts, at step S105, the system controller 41 initializes the parameter TECHYS (FIG. 6). Conventionally, TECHYS is constant; by contrast, in the present invention, TECHYS is variable. TECHYS is stored in the storage section 45. The system controller 41 can rewrite the storage section 45 to change the value of TECHYS.

Steps S110 through S150 are similar to those in FIG. 4, and therefore no overlapping description will be repeated. After the execution of step S150, at step S210, the system controller 41 controls the DSP 31 to check for a tracking servo deviation for one turn of the track of the optical disc 2.

Conventionally (FIG. 4), a check for a tracking servo deviation is made for a predetermined period (10 ms); to ensure that a spot of erroneous detection of a tracking deviation is passed during a retry (step S230), however, the check needs to be made at least for one turn of the track. Accordingly, in the present invention, the period for which the check is made is determined based on a distance, not a lapse of time.

If the check result is "OK," that is, no tracking servo deviation is detected while the optical disc 2 is rotated one turn, the flow ends, and a read operation follows. At this point, the system controller 41 restores the TECHYS stored in the storage section 45 to its initial value. Failure to restore it to its initial value may cause failure to detect a tracking failure when one should be detected.

If the check result is "NG," then, at step S220, the system controller 41 controls the DSP 31 to execute a track-on once again. Here, the traverse position is not changed.

The reasons that the traverse position is not changed here are as follows. If it is changed, the spot of erroneous detection of a tracking deviation may not be passed during a retry (step S230), and also the destination may not be a spot where the TEC signal tends to rise. As a result, tracking servo deviations are not detected consecutively, and thus TECHYS is not changed. To avoid that, no change is made in the traverse position.

Next, at step S230, as at step S210, the system controller 41 controls the DSP 31 to check for a tracking servo deviation for one turn of the track of the optical disc 2. The reason that the same operation is repeated here is that, considering that a detected tracking failure can be the result of correct detection, and not of erroneous detection, it would be risky to change TECHYS based on a single detection result.

If the check result is "OK," the flow ends, and a read operation follows; in addition, TECHYS is restored to its initial value. If the check result is "NG," then, at step S240, the system controller 41 checks whether or not the value of CNT equals 1. If CNT does not equal 1, TECHYS is regarded as having already been changed, and the flow proceeds to step S170.

If CNT equals 1, then, at step S250, the system controller 41 changes the value of TECHYS, and the flow then proceeds to step S170. Specifically, TECHYS is increased by 3 dB. This reduces the frequency of rises in the binarized TEC signal.

Steps S170 through S190 are similar to those in FIG. 4, and therefore no overlapping description will be repeated. What should be noted, however, is that, after the execution of step S190, the system controller 41 restores the TECHYS stored in the storage section 45 to its initial value.

According to the above-described embodiment of the invention, when two tracking servo deviations are detected consecutively during tracking, TECHYS is changed; thus, the settings are changed such that the binarized TEC signal is less likely to rise. In this way, it is possible to prevent failure to mount the optical disc 2, and halts in video during playback, resulting from erroneous detection of tracking failures.

Modifications and Variations

It should be understood that the preferred embodiments and examples by way of which the present invention has been described hereinbefore are in no way meant to limit how the invention is to be carried out; the invention allows for many modifications and variations made within the scope of spirit of its technical idea.

Thus, the invention may also be implemented as follows.

(A) Although the embodiment described above deals with a case where the functions related to the track retry operation according to the invention are realized through execution of a software program on a calculation processing device such as a microprocessor, those functions may instead be realized by a plurality of circuits.

(B) Although the embodiment described above deals with a disc player 100 as an optical disc apparatus that executes a track retry operation according to the invention, the invention may be applied to any other optical disc apparatus; for example, it may be applied to DVD recorders for recording to optical discs.

What is claimed is:

1. An optical disc apparatus, comprising:
an optical pickup including
a light source which irradiates a recording surface of an optical disc with a light beam and
a photodetector which performs photoelectric conversion on light reflected from the recording surface;
a signal generation section which generates a tracking error signal and a track cross signal from an electrical signal obtained by the photoelectric conversion;
a servo control section which controls tracking of the optical pickup according to the tracking error signal and the track cross signal;
a storage section which has stored therein a threshold value for binarizing the track cross signal; and
a main control section which binarizes the track cross signal by using the threshold value and, by using the binarized track cross signal, checks a tracing state of a track provided on the recording surface, wherein
when the servo control section detects a predetermined error, the main control section increases the threshold value and binarizes the track cross signal by using the increased threshold value.

2. The optical disc apparatus according to claim 1, wherein the main control section controls the servo control section to check, by tracing one turn of the track of the optical disc, whether or not a tracking servo deviation occurs, and
when a tracking servo deviation occurs, the main control section controls the servo control section to make the check once again, and
when, in the check made once again, a tracking servo deviation is found to occur again, the main control section increases the threshold value.

3. The optical disc apparatus according to claim 2, wherein when the main control section controls the servo control section to make the check once again, the main control section controls the servo control section to make the check once again for the same one turn of the track as that in which the tracking servo deviation was detected.

4. The optical disc apparatus according to claim 3, wherein the main control section initializes the threshold value when the servo control section no longer detects the error or the servo control section ends tracking servo.

* * * * *